(No Model.)
M. M. DAVIS.
STATIC COMPENSATOR FOR TELEGRAPHS.
No. 381,220. Patented Apr. 17, 1888.
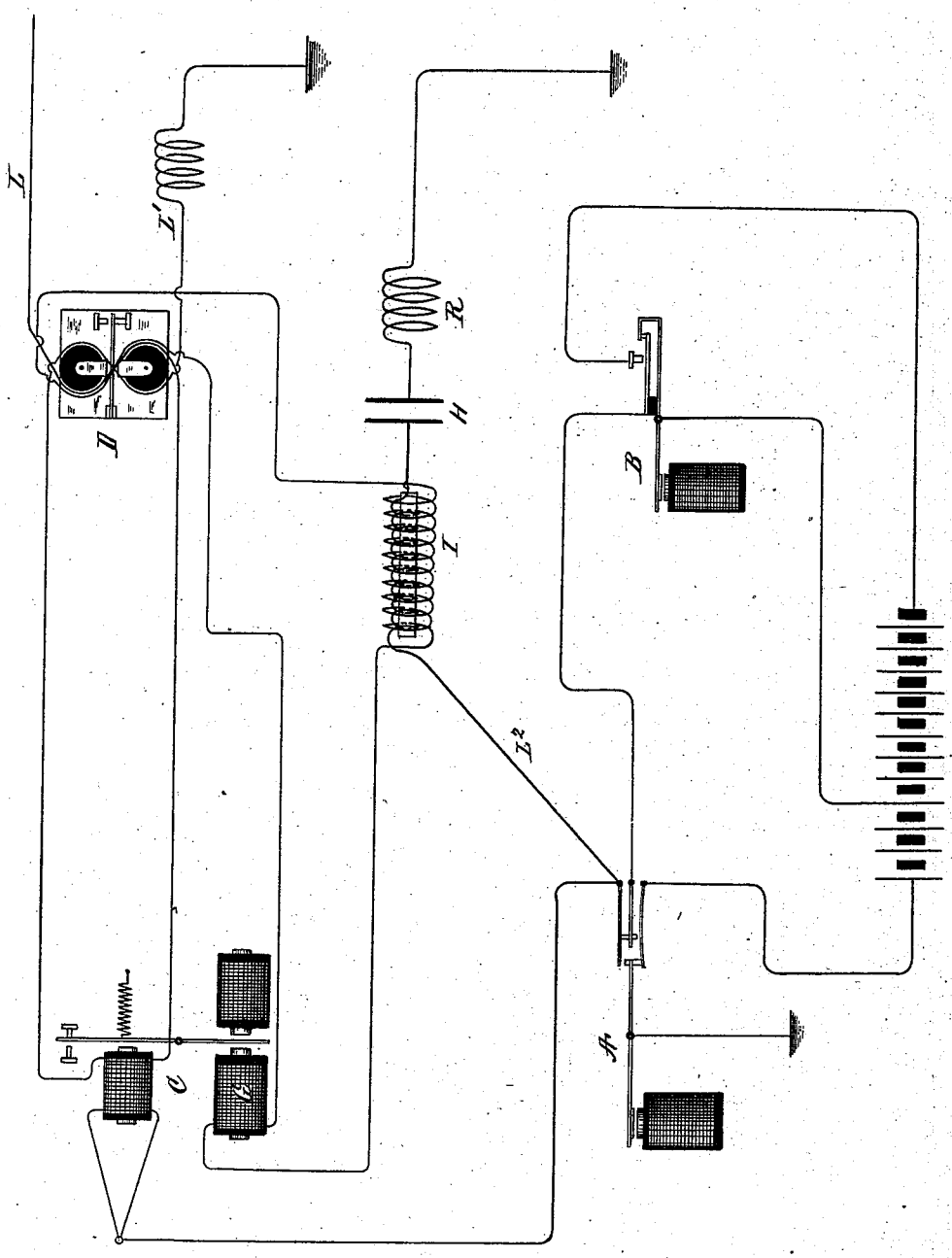
WITNESSES:
INVENTOR.
Minor M. Davis.
BY
ATTORNEYS.

UNITED STATES PATENT OFFICE.

MINOR M. DAVIS, OF BROOKLYN, NEW YORK.

STATIC COMPENSATOR FOR TELEGRAPHS.

SPECIFICATION forming part of Letters Patent No. 381,220, dated April 17, 1888.

Application filed May 4, 1887. Serial No. 237,024. (No model.)

*To all whom it may concern:*

Be it known that I, MINOR M. DAVIS, a citizen of the United States, and a resident of Brooklyn, in the county of Kings and State of New York, have invented certain new and useful Static Compensators for Telegraphs, of which the following is a specification.

My invention relates to telegraph apparatus in which the effects of static charge and discharge current accompanying the operation of a transmitter are the source of disturbance and false signals in the receiving apparatus at the same station with the transmitting apparatus.

My invention relates to apparatus in which such tendency to disturbance is compensated for by the secondary current of an induction-coil whose primary is included in a branch to earth.

The object of my invention is to prevent undue diversion of current in said branch; and to this end it consists in the combination, with the branch having the primary of the induction-coil, of a condenser whose plates are interposed in the direct circuit of said primary.

I have herein illustrated the application of my invention to an induction-coil which is employed in connection with an ordinary quadruplex-telegraph apparatus; but my device may be used with other arrangements and other forms of telegraph, as will be obvious to those skilled in the art.

In the accompanying drawing, A indicates the pole-changing transmitter, and B the tension-changing transmitter, of a common form of quadruplex telegraph, while C indicates the neutral and D the polar relay at the home station, with instruments A B.

L indicates the main line, and L' the ordinary artificial line, while $L^2$ indicates a branch to earth, including the primary of an induction-coil, I, whose secondary connects with the instruments or circuits of the instruments C D in such way that the effect of the static charge or discharge current in line L upon said instruments or apparatus shall be compensated for or neutralized by the simultaneously-growing secondary current set up in the instrument I at the time current begins to flow in the branch $L^2$ and at the time current ceases to flow in said branch. Some of the ways in which the secondary current from said coil may be utilized for purposes of compensation are herein illustrated; but many other plans—such as are employed in various compensating apparatus for duplex and quadruplex telegraphs—might be used in the same way.

In connection with instrument C, the compensation is effected by an electro-magnet, G, through which the secondary current flows, and which pulls on the armature-lever of said relay in opposition to the pull occurring at the time of the static charge and discharge.

On the instrument D the compensation is effected by carrying the current from the secondary coil through a coil which shall act upon said instrument in a manner opposite to the main-line coil when excited by the static charge and discharge current.

H indicates the condenser of my invention, which, as indicated, is included in the branch $L^2$, and acts to prevent undue diversion of current into said branch and undue waste of battery-power. Said condenser also serves in a measure to cut off the free flow of current to earth when the incoming current flows.

In the operation of the apparatus the current flows to the branch $L^2$ and the primary of the induction-coil I at the same time that the current flows to line L, so that the static-charge current on the line is accompanied by the secondary current from the induction-coil, which acts as a compensator, as already explained. When the key A or B returns to its back-stop, the induction-coil I gives out a secondary current, which acts on the instruments C D at the instant of the static discharge from line L and prevents any false signal in obvious manner. The incoming currents from line L flow, but to little extent, into branch $L^2$, because of condenser H, and because, further, a path of much lower resistance is found through the transmitting apparatus.

If desired, an artificial resistance, R, may be included also in the branch $L^2$, at any desired part thereof, and may be made adjustable, as is well understood in the art.

What I claim as my invention is—

In a static compensating apparatus for duplex and quadruplex telegraphs, the combination, with the compensating induction-coil having its secondary connected to the compensating circuit and its primary included in a branch to earth from the line-connections, of a condenser interposed in said branch, as and for the purpose described.

Signed at New York, in the county of New York and State of New York, this 30th day of April, A. D. 1887.

MINOR M. DAVIS.

Witnesses:
WM. H. CAPEL,
F. S. JONES.